(12) United States Patent
Huang

(10) Patent No.: US 8,503,185 B2
(45) Date of Patent: Aug. 6, 2013

(54) BOOKMARK MEMORY STICK

(75) Inventor: Joseph Huang, Taoyuan (TW)

(73) Assignee: Ho E Screw & Hardware Co., Ltd., Lu-Chu, Taoyuan (TW)

( * ) Notice: Subject to any disclaimer, the term of this patent is extended or adjusted under 35 U.S.C. 154(b) by 240 days.

(21) Appl. No.: 13/189,461

(22) Filed: Jul. 22, 2011

(65) Prior Publication Data

US 2013/0021741 A1    Jan. 24, 2013

(51) Int. Cl.
*G06F 1/16* (2006.01)

(52) U.S. Cl.
USPC ...... 361/752; 361/679.32; 361/801; 361/802; 174/50; 174/559

(58) Field of Classification Search
USPC ......... 361/679.31, 67.32, 737, 752, 801–803; 439/135, 149, 353, 358, 660; 174/50, 59, 174/559, 560
See application file for complete search history.

(56) References Cited

U.S. PATENT DOCUMENTS

| | | | |
|---|---|---|---|
| 7,074,052 B1 * | 7/2006 | Ni et al. | 439/76.1 |
| 7,503,780 B1 * | 3/2009 | Huang | 439/135 |
| 7,771,215 B1 * | 8/2010 | Ni et al. | 439/131 |
| 7,811,101 B2 * | 10/2010 | Tang et al. | 439/131 |
| D631,058 S * | 1/2011 | Chin et al. | D14/480.7 |
| 8,081,483 B2 * | 12/2011 | Huang | 361/752 |
| 8,116,083 B2 * | 2/2012 | Ni et al. | 361/737 |
| 8,116,086 B2 * | 2/2012 | Huang | 361/752 |
| 8,353,709 B2 * | 1/2013 | Tang et al. | 439/131 |
| 2008/0156871 A1 * | 7/2008 | Fidalgo et al. | 235/382 |
| 2008/0233776 A1 * | 9/2008 | Tang et al. | 439/131 |
| 2008/0276099 A1 * | 11/2008 | Nguyen et al. | 713/186 |
| 2010/0290180 A1 * | 11/2010 | Huang | 361/679.32 |
| 2010/0290181 A1 * | 11/2010 | Huang | 361/679.32 |
| 2012/0327610 A1 * | 12/2012 | Huang | 361/740 |
| 2013/0044423 A1 * | 2/2013 | Huang | 361/679.32 |

FOREIGN PATENT DOCUMENTS

| | | | |
|---|---|---|---|
| AU | 2012100531 A4 * | 5/2012 | |
| CN | 201805652 U * | 4/2011 | |
| CN | 102395251 A * | 3/2012 | |
| CN | 202394529 U * | 8/2012 | |
| TW | M377676 | | 4/2010 |
| TW | 436915 U * | 9/2012 | |
| WO | WO 2010136025 A1 * | 12/2010 | |

* cited by examiner

*Primary Examiner* — Hoa C Nguyen
*Assistant Examiner* — Amol Patel
(74) *Attorney, Agent, or Firm* — Guice Patents PLLC

(57) ABSTRACT

A bookmark memory stick includes a PC board, a flat, elongated insulative holder shell having a recessed accommodation portion accommodating the PC board and a retaining hole disposed near the top end thereof, a metal cover shell surrounding the insulative holder shell and a clip, which has a transverse locating base fitted into a locating notch at the top end of the insulative holder shell, a double-bevelled clamping plate obliquely downwardly extended from the front side of the transverse locating base toward the inside of the metal cover shell and stopped against a inverted T-plate of the insulative holder shell and then curved obliquely outwardly for clamping a sheet member on the inverted T-plate, a back plate extended from the back side of the transverse locating base and inserted into the inner top side of the metal cover shell, and a hook plate obliquely extended from the back plate and engaged into the retaining hole of the insulative holder shell.

11 Claims, 10 Drawing Sheets

BOOKMARK MEMORY STICK

BACKGROUND OF THE INVENTION

1. Field of the Invention

The present invention relates to USB memory stick and more particularly, a low profile bookmark memory stick that has a thin thickness and practical for use as a bookmark.

2. Description of the Related Art

A USB memory stick is a mobile data storage device convenient for carrying and connectable to a computer for data access. Following development of data storage technology, the storage capacity of regular USB memory sticks has been greatly expanded for wide field applications.

A regular USB memory stick generally comprises a metal shell made of a metal sheet member by stamping, a plastic shell surrounding the metal shell, a PC board accommodated in the metal shell and having a packaged circuit that provides a data storage function, and an insulative member fastened to the metal shell and stopped against the PC board. When a USB memory stick of this design is assembled, the insulative member and the PC board are fixedly secured to the inside of the metal shell and not detachable for a replacement. If the packaged circuit of the PC board is damaged, the mobile memory stick becomes useless and not repairable. Further, when wishing the increase the memory capacity, the user cannot replace the PC board to make an adjustment.

Taiwan Patent M377676 discloses a new design, entitled "USB memory stick", which allows replacement of the PC board. However, this improved design of USB memory stick has a certain thickness and the drawback of being not easy to assemble. An improvement in this regard is necessary.

SUMMARY OF THE INVENTION

The present invention has been accomplished under the circumstances in view. It is the main object of the present invention to provide a bookmark memory stick, which has a thin thickness practical for use as a bookmark.

To achieve this and other objects of the present invention, a bookmark memory stick comprises a PC board having a packaged circuit on its one side and a USB interface circuit on its other side, a flat, elongated insulative holder shell having a recessed accommodation portion accommodating the PC board and a retaining hole disposed near the top end thereof, a metal cover shell surrounding the insulative holder shell and a clip, which has a transverse locating base fitted into a locating notch at the top end of the insulative holder shell, a double-bevelled clamping plate obliquely downwardly extended from the front side of the transverse locating base toward the inside of the metal cover shell and stopped against an outer wall of the insulative holder shell and then curved obliquely outwardly for clamping a sheet member on the insulative holder shell, a back plate extended from the back side of the transverse locating base and inserted into the inner top side of the metal cover shell, and a hook plate obliquely extended from the back plate and engaged into the retaining hole of the insulative holder shell.

Further, the insulative holder shell comprises an inverted T-plate suspending above the recessed accommodation portion and covered on the packaged circuit of the PC board. The inverted-T plate has the widest bottom side thereof made equal to the width of the PC board. The insulative holder shell further comprises two longitudinal grooves extending along two opposite lateral sides of the upper part of the inverted-T plate. Further, the metal cover shell comprises two longitudinal hook flanges respectively hooked in the longitudinal grooves of the insulative holder shell.

Further, the insulative holder shell comprises a locating notch transversely extending along the top end thereof and adapted for accommodating the transverse locating base of the clip.

The insulative holder shell further comprises a flat rectangular protrusion protruded from the back wall thereof opposite to the recessed accommodation portion. The metal cover shell further comprises a rectangular back notch accommodating the flat rectangular protrusion of the insulative holder shell.

In an alternate form of the present invention, the insulative holder shell consists of an upper holder shell member and a lower holder shell member; the recessed accommodation portion is defined in the lower holder shell member; the insulative holder shell further comprises a first recessed hole located on the upper holder shell member and a second recessed hole located on the lower shell member; the metal cover shell further comprises a first retaining block and a second retaining block respectively engaged into the first recessed hole and second recessed hole of the insulative holder shell.

Subject to the aforesaid arrangement, the bookmark memory stick provided by the present invention has the characteristics of ease of installation and PC board replacement allowability. Further, the whole structure of the bookmark memory stick has a thin thickness. Thus, the user can clamp the double-bevelled clamping plate of the clip on a page of a book to keep the user's place in the book.

DETAILED DESCRIPTION OF THE PREFERRED EMBODIMENT

Figures 1, 1A:
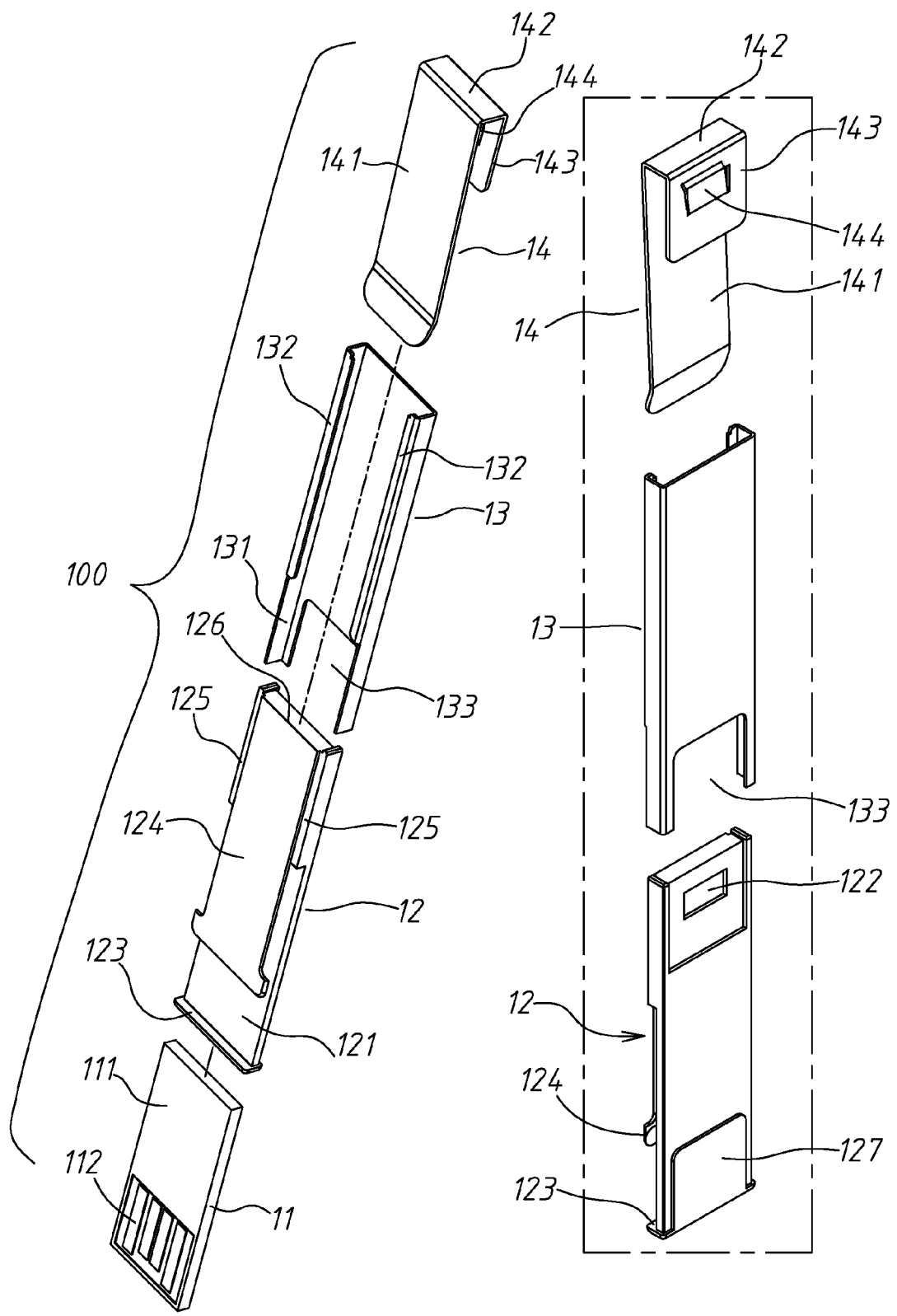
FIG. 1 is an exploded view of a bookmark memory stick in accordance with a first embodiment of the present invention.
FIG. 1A is another exploded view of the bookmark memory stick in accordance with the first embodiment of the present invention when viewed from another angle (the PC board excluded).

Referring to FIGS. 1~4, a bookmark memory stick 100 in accordance with a first embodiment of the present invention is shown comprising a PC board 11, an insulative holder shell 12, a metal cover shell 13 and a clip 14.

The PC board 11 has a packaged circuit 111 located on its top side and a USB interface circuit 112 located on its bottom side.

Figures 5, 6:
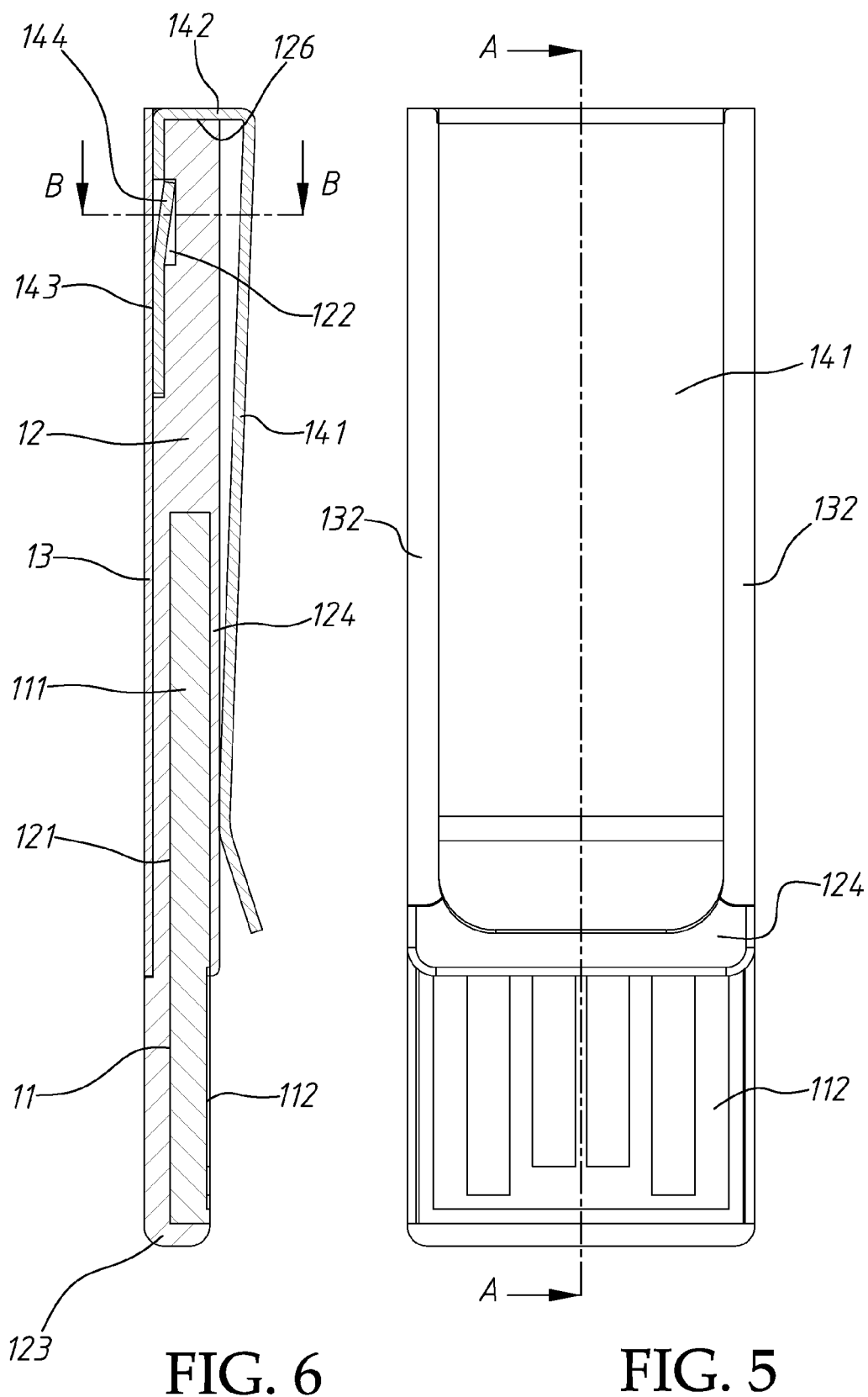
FIG. 5 is a plain view of the bookmark memory stick in accordance with the first embodiment of the present invention.
FIG. 6 is a sectional view taken along line A-A of FIG. 5.

The insulative holder shell 12 is a flat, elongated member having a recessed accommodation portion 121 adapted for accommodating the PC board 11, a retaining hole 122 located on one end, namely, the top end of the recessed accommodation portion 121, as illustrated in FIG. 1A, a stop flange 123 transversely disposed at an opposite end, namely, the bottom end of the recessed accommodation portion 121 to stop the PC board 11 in the recessed accommodation portion 121, an inverted T-plate 124 suspending above the recessed accommodation portion 121 and covered on the surface of the packaged circuit 111 of the PC board 11, as illustrated in FIG. 6, two longitudinal grooves 125 extending along two opposite lateral sides of the upper part of the inverted-T plate 124, a locating notch 126 transversely extending along the top end of the inverted-T plate 124, and a flat rectangular protrusion 127 protruded from the back wall at the bottom end thereof opposite to the recessed accommodation portion 121, as illustrated in FIG. 1A. Further, the width of the bottom end of the inverted T-plate 124 is approximately equal to the width of the PC board 11 (see FIG. 5).

Figure 4:
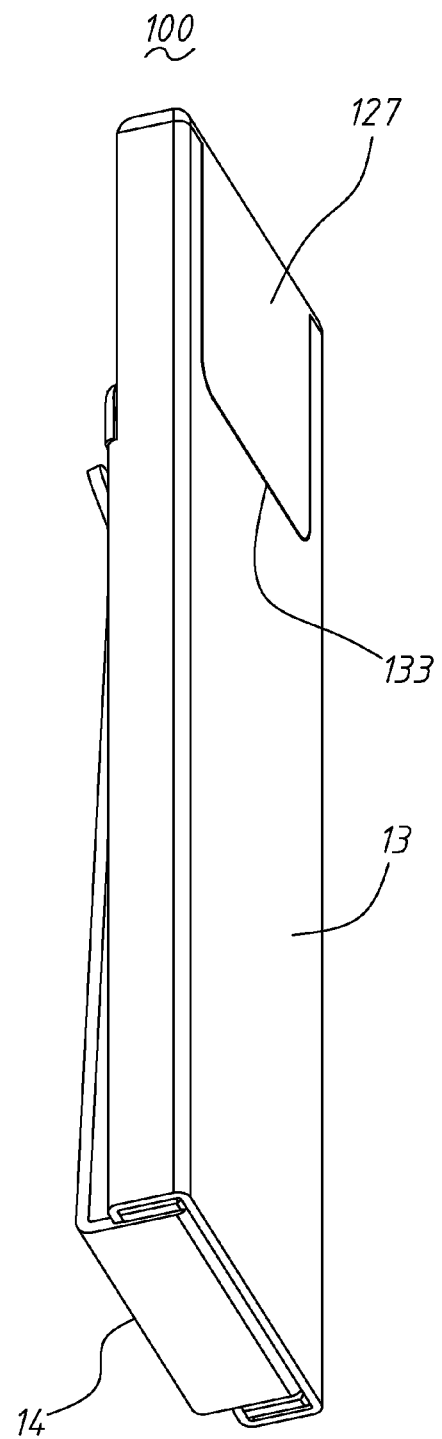
FIG. 4 corresponds to FIG. 3 when viewed from another angle.
Figure 7:
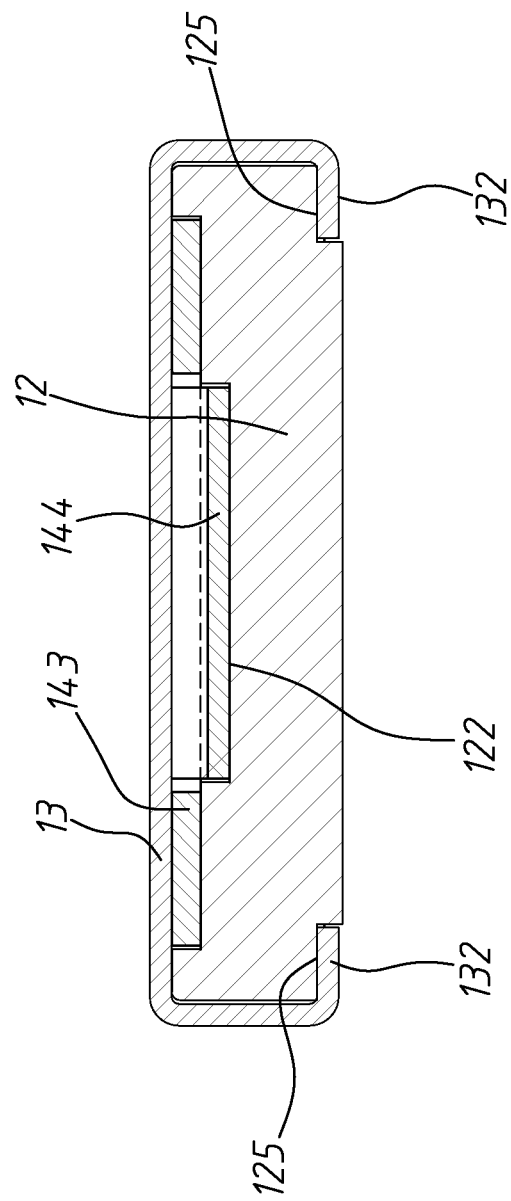
FIG. 7 is a sectional view taken along line B-B of FIG. 5.

The metal cover shell 13 is a metal sheet member surrounding the insulative holder shell 12, having an opening 131 corresponding to the USB interface circuit 112, two longitudinal hook flanges 132 respectively hooked in the longitudinal grooves 125 at two opposite lateral sides of the inverted T-plate 124, as illustrated in FIG. 7, and a rectangular back notch 133 that accommodates the flat rectangular protrusion 127, as illustrated in FIG. 4.

The clip 14 is preferably made of metal, having a transverse locating base 142 fitted into the locating notch 126 of the insulative holder shell 12, a double-bevelled clamping plate 141 obliquely downwardly extended from the front side of the transverse locating base 142 toward the inside of the metal cover shell 13 and stopped against the inverted T-plate 124 and then curved obliquely outwardly (see FIG. 6) for clamping a sheet member on the inverted T-plate 124, a back plate 143 extended from the back side of the transverse locating base 142 and inserted into the inner top side of the metal cover shell 13, and a hook plate 144 obliquely extended from the back plate 143 and engaged into the retaining hole 122 of the insulative holder shell 12, as illustrated in FIG. 7.

Figure 2:
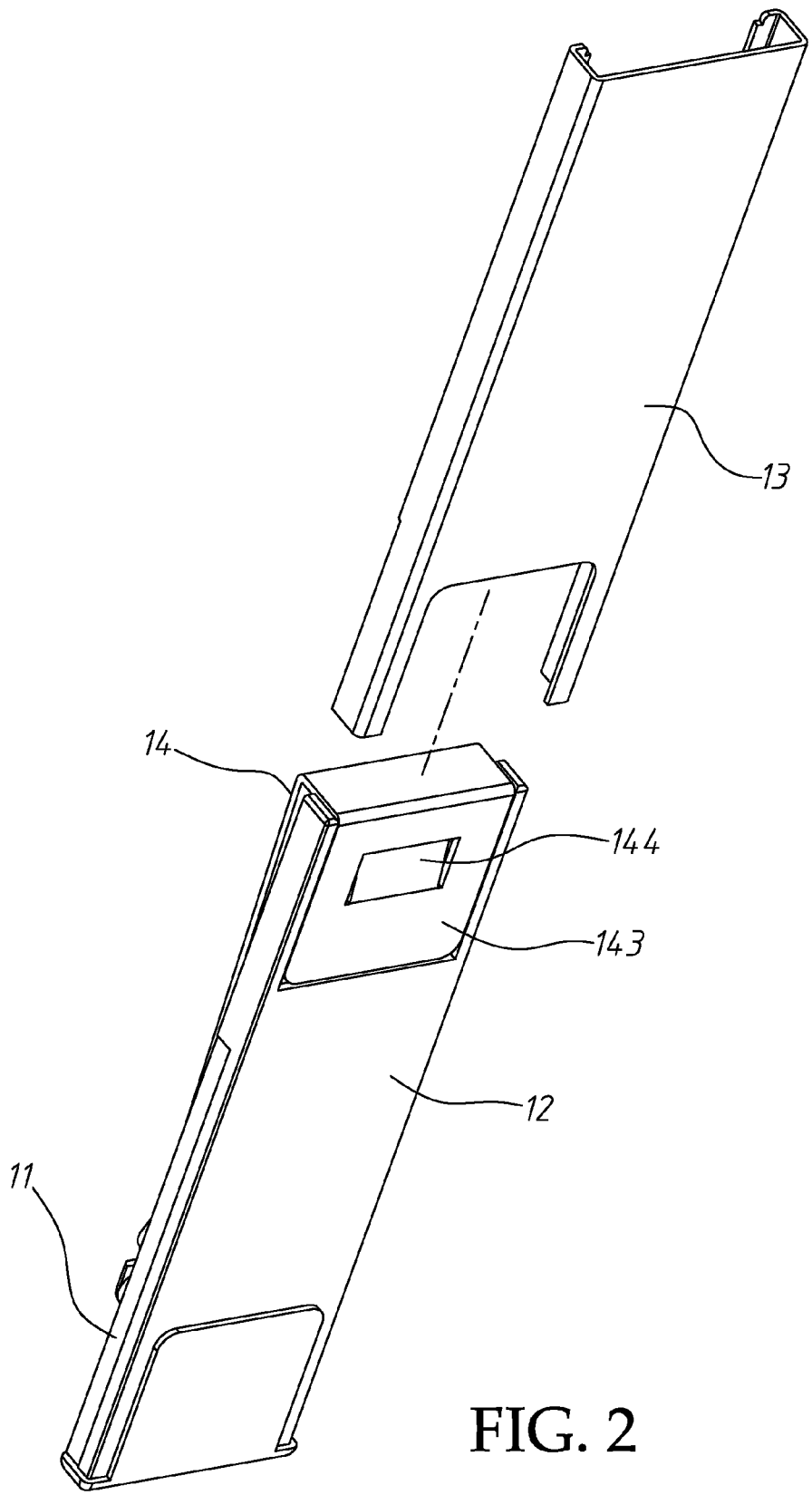
FIG. 2 is an elevational assembly view of the bookmark memory stick in accordance with the first embodiment of the present invention before installation of the metal shell.
Figure 3:
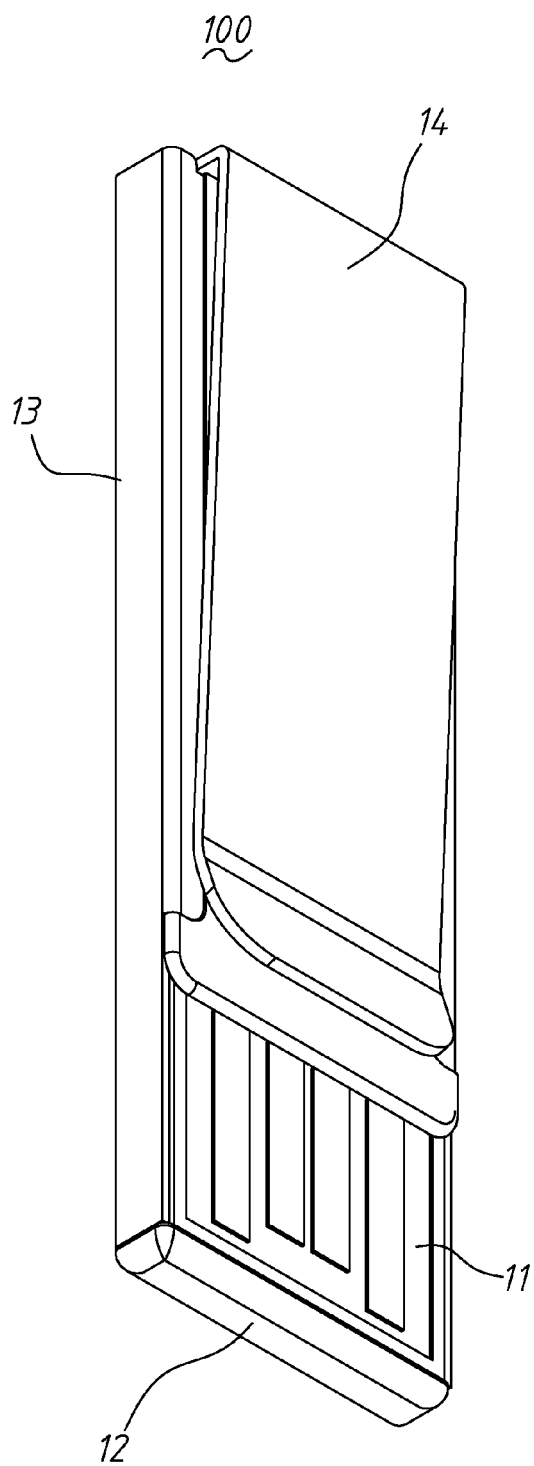
FIG. 3 is an oblique elevation of the bookmark memory stick in accordance with the first embodiment of the present invention.

Based on the aforesaid arrangement, the installation of the bookmark memory stick is quite simple. During installation, set the PC board 11 into the recessed accommodation portion 121 of the insulative holder shell 12, and then force the hook plate 144 of the clip 144 into the retaining hole 122 of the insulative holder shell 12, as illustrated in FIG. 2, and then insert the two longitudinal hook flanges 132 of the metal cover shell 13 into the longitudinal grooves 125 at the two opposite lateral sides of the inverted T-plate 124, and thus the bookmark memory stick 100 is assembled, as illustrated in FIG. 3.

Figure 8:
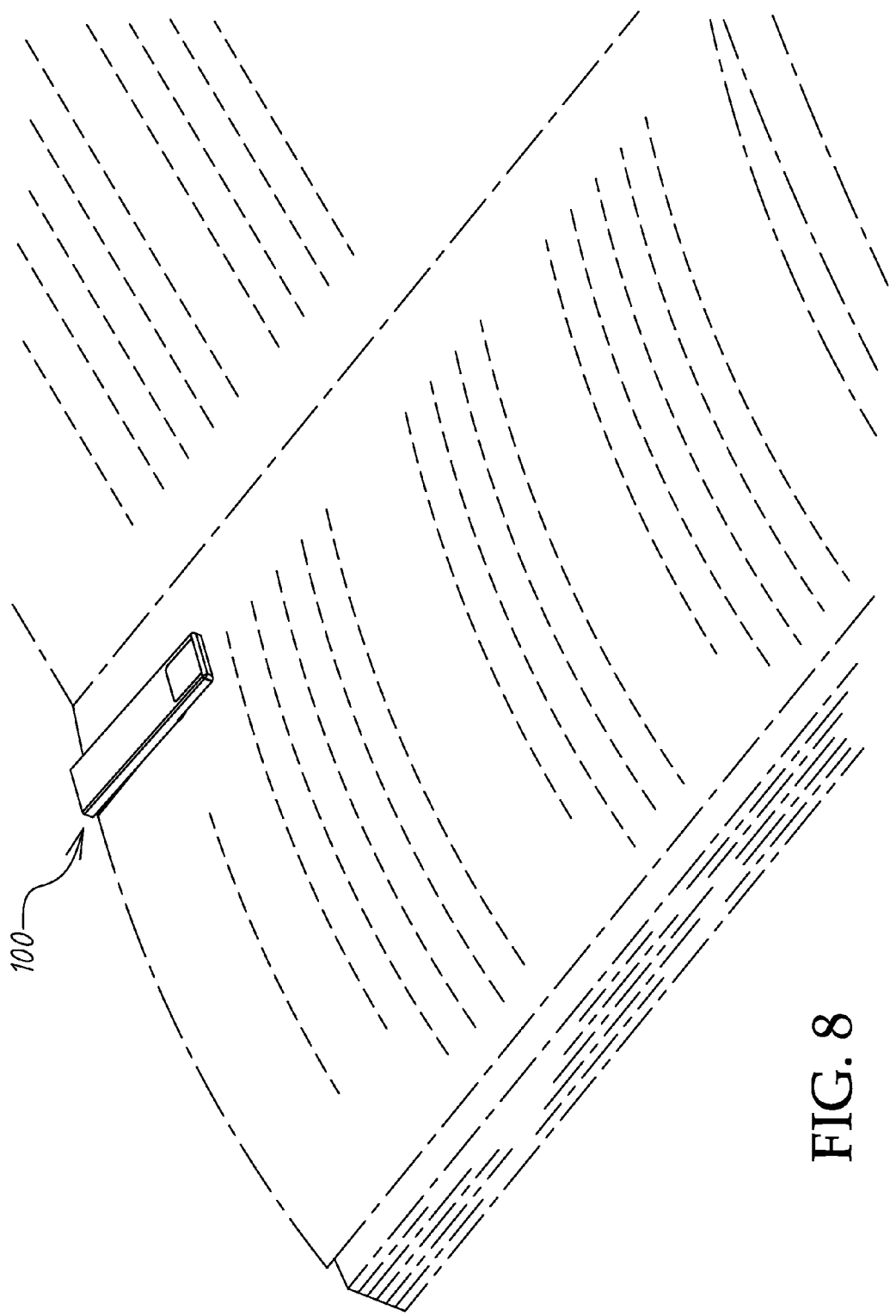
FIG. 8 is a schematic drawing illustrating a status of use of the bookmark memory stick in accordance with the first embodiment of the present invention.

When assembled, the bookmark memory stick 100 can be inserted into a USB port of a computer for storing data. As the bookmark memory stick 100 has a thin thickness, it can be used as a bookmark. In this case, as illustrated in FIG. 8, the user can clamp the double-bevelled clamping plate 141 of the clip 14 on a page of a book to keep the user's place in the book.

Figure 9:
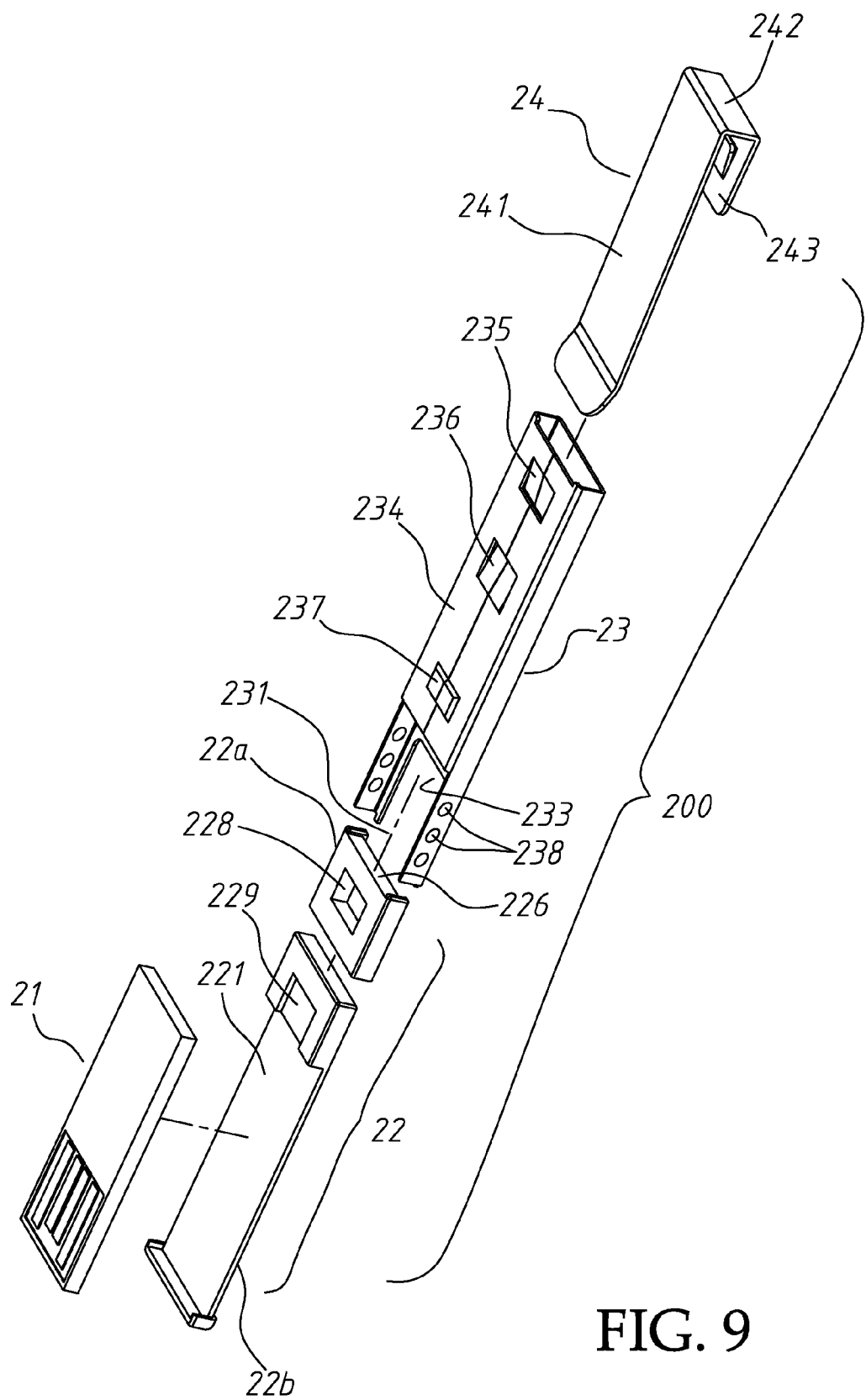
FIG. 9 is an exploded view of a bookmark memory stick in accordance with a second embodiment of the present invention.
Figure 10:
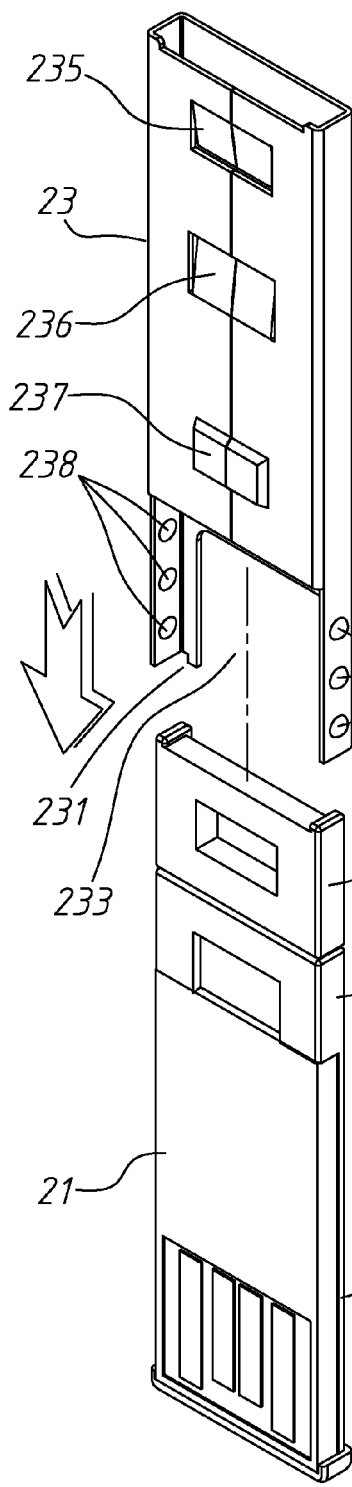
FIG. 10 is an elevational assembly view of the bookmark memory stick in accordance with the second embodiment of the present invention.
Figure 11A:
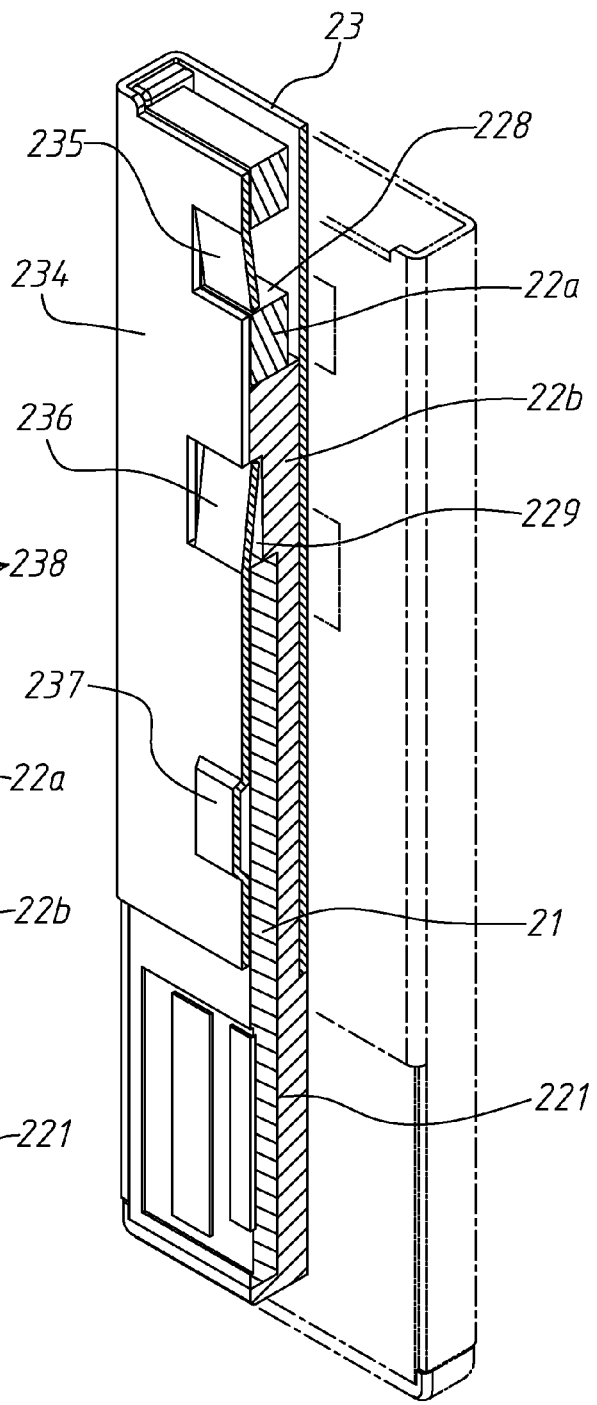
FIG. 11A is a sectional elevation of the bookmark memory stick in accordance with the second embodiment of the present invention.
Figure 11:
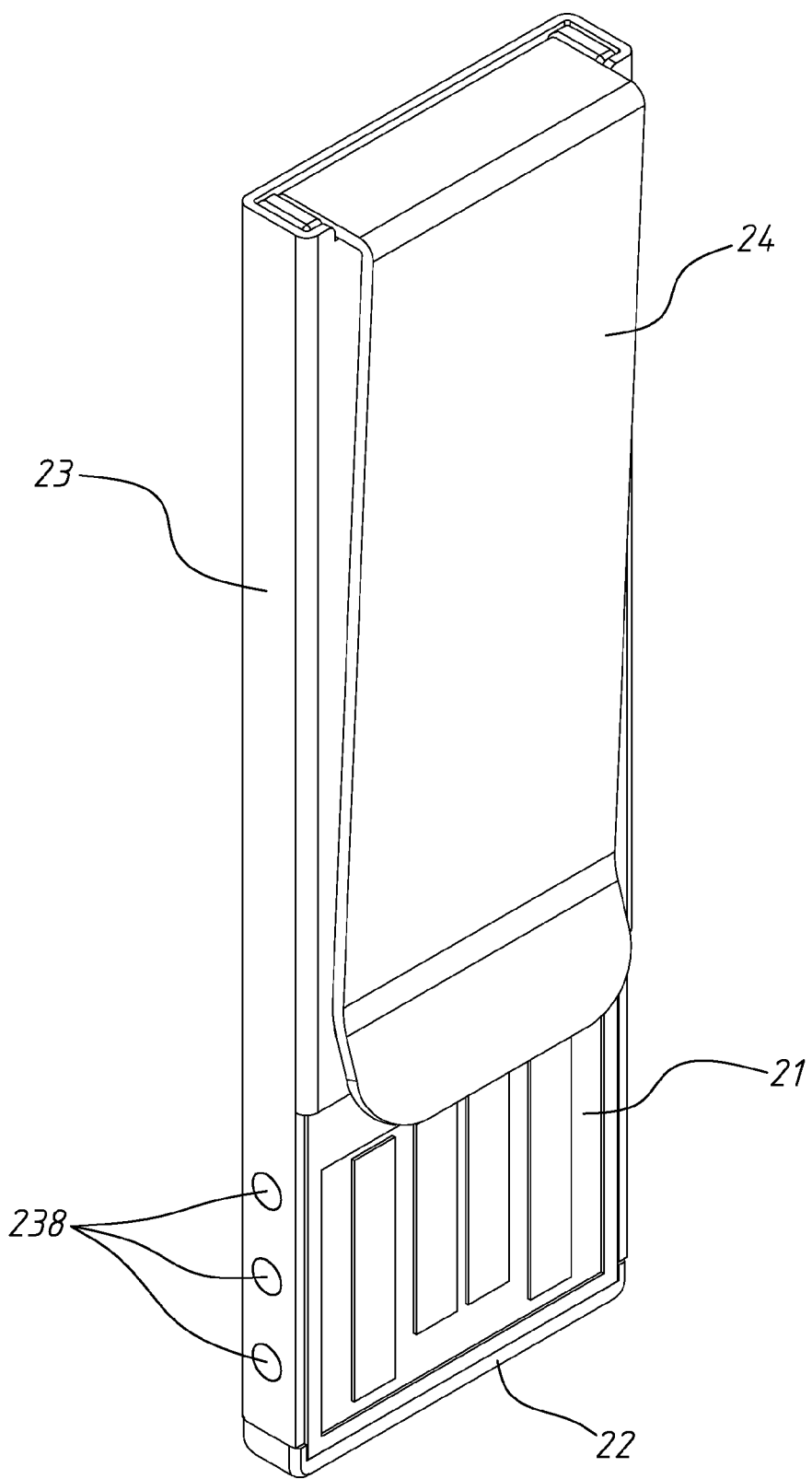
FIG. 11 is an oblique elevational view of the bookmark memory stick in accordance with the second embodiment of the present invention.

FIGS. 9~11 illustrate a bookmark memory stick 200 in accordance with a second embodiment of the present invention. According to this second embodiment, the bookmark memory stick 200 comprises a PC board 21, an insulative holder shell 22, a metal cover shell 23 and a clip 24.

Figure 12:
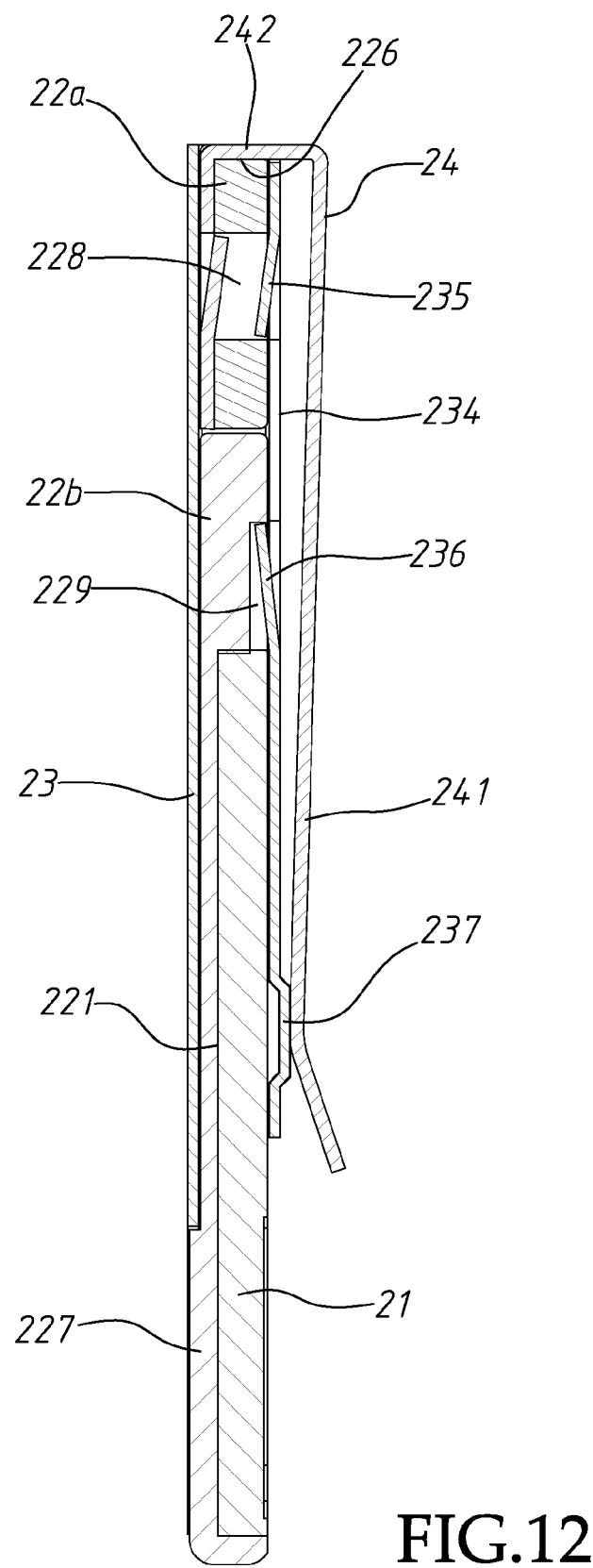
FIG. 12 is a sectional side view of the bookmark memory stick in accordance with the second embodiment of the present invention.

According to this second embodiment, the insulative holder shell 22 consists of an upper holder shell member 22a and a lower holder shell member 22b. The insulative holder shell 22 comprises a recessed accommodation portion 221 defined in the lower holder shell member 22b, a first recessed hole 228 located on the upper holder shell member 22a and a second recessed hole 229 located on the lower shell member 22b. The metal cover shell 23 comprises a first retaining block 235 and a second retaining block 236 formed of the peripheral wall thereof by stamping and respectively engaged into the first recessed hole 228 and second recessed hole 229 of the insulative holder shell 22, as illustrated in FIGS. 11A and 12. Subject to the aforesaid arrangement, the insulative holder shell 22 does not need to provide the aforesaid inverted T-plate 124, simplifying the molding of the insulative holder shell 22.

Further, the upper holder shell member 22a of the insulative holder shell 22 comprises the locating notch 226 transversely extending along the top end thereof for accommodating the transverse locating base 242 of the clip 24. The insulative holder shell 22 further comprises a flat rectangular protrusion 227 protruded from the back wall of the lower shell member 22b opposite to the recessed accommodation portion 221. The metal cover shell 23 further comprises a rectangular back notch 233 that accommodates the flat rectangular protrusion 227 of the insulative holder shell 22.

Further, the metal cover shell 23 comprises a protruding block 237 spaced below the second retaining block 236 and kept in contact with the curved part of the double-bevelled clamping plate 241 of the clip 24, as illustrated in FIG. 12, enhancing the sheet-clamping function of the clip 24. Further, the metal cover shell 23 has a plurality of raised portions 238 arranged at two opposite lateral sides relative to the opening 231 adapted for increasing friction resistance upon insertion of the bookmark memory stitch in a USB port of a computer.

The installation of the bookmark memory stick 200 of this second embodiment is as easy as the aforesaid first embodiment. During installation, set the PC board 21 into the recessed accommodation portion 221 of the insulative holder shell 22, as illustrated in FIG. 10, and then attach the metal cover shell 23 to the insulative holder shell 22, and then insert the back plate 343 into the inner top side of the metal cover shell 33, as illustrated in FIG. 11.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A bookmark memory stick, comprising:
   a PC board comprising a packaged circuit located on a top side thereof and a USB interface circuit located on a bottom side thereof;
   a flat, elongated insulative holder shell comprising a recessed accommodation portion accommodating said PC board and a retaining hole disposed near a top end of said recessed accommodation portion;

a metal cover shell surrounding said insulative holder shell, said metal cover shell having an opening corresponding to said USB interface circuit; and a clip comprising a transverse locating base attached to the top end of said insulative holder shell, a double-bevelled clamping plate obliquely downwardly extended from a front side of said transverse locating base toward the inside of said metal cover shell and stopped against an outer wall of said insulative holder shell and then curved obliquely outwardly for clamping a sheet member on said insulative holder shell, a back plate extended from a back side of said transverse locating base and inserted into an inner top side of said metal cover shell and a hook plate obliquely extended from said back plate and engaged into said retaining hole of said insulative holder shell.

2. The bookmark memory stick as claimed in claim 1, wherein said insulative holder shell comprises a stop flange transversely disposed at a bottom end thereof and stopped against one end of said PC board in said recessed accommodation portion.

3. The bookmark memory stick as claimed in claim 1, wherein said insulative holder shell further comprises an inverted T-plate suspending above said recessed accommodation portion and covered on said packaged circuit of said PC board.

4. The bookmark memory stick as claimed in claim 3, wherein said inverted-T plate has the widest bottom side thereof made equal to the width of said PC board; said insulative holder shell further comprises two longitudinal grooves extending along two opposite lateral sides of an upper part of said inverted-T plate; said metal cover shell comprises two longitudinal hook flanges respectively hooked in the longitudinal grooves of said insulative holder shell.

5. The bookmark memory stick as claimed in claim 3, wherein said insulative holder shell further comprises a locating notch transversely extending along the top end thereof and adapted for accommodating said transverse locating base of said clip.

6. The bookmark memory stick as claimed in claim 3, wherein said insulative holder shell further comprises a flat rectangular protrusion protruded from a back wall thereof opposite to said recessed accommodation portion; said metal cover shell further comprises a rectangular back notch accommodating said flat rectangular protrusion of said insulative holder shell.

7. The bookmark memory stick as claimed in claim 2, wherein said insulative holder shell consists of an upper holder shell member and a lower holder shell member; said recessed accommodation portion is defined in said lower holder shell member; said insulative holder shell further comprises a first recessed hole located on said upper holder shell member and a second recessed hole located on said lower shell member; said metal cover shell further comprises a first retaining block and a second retaining block respectively engaged into said first recessed hole and said second recessed hole of said insulative holder shell.

8. The bookmark memory stick as claimed in claim 7, wherein said upper holder shell member of said insulative holder shell comprises a locating notch transversely extending along a top end thereof for accommodating the transverse locating base of said clip.

9. The bookmark memory stick as claimed in claim 7, wherein said insulative holder shell further comprises a flat rectangular protrusion protruded from a back wall of said lower shell member opposite to said recessed accommodation portion; said metal cover shell further comprises a rectangular back notch that accommodates said flat rectangular protrusion of said insulative holder shell.

10. The bookmark memory stick as claimed in claim 7, wherein said metal cover shell further comprises a protruding block spaced below said second retaining block and kept in contact with the curved part of said double-bevelled clamping plate of said clip.

11. The bookmark memory stick as claimed in claim 7, wherein said metal cover shell further comprises a plurality of raised portions arranged at two opposite lateral sides relative to the opening thereof.

* * * * *